US006917014B2

(12) United States Patent
Makutonin et al.

(10) Patent No.: US 6,917,014 B2
(45) Date of Patent: Jul. 12, 2005

(54) SEALING SYSTEM FOR FORMING THERMAL SEALS AND METHODS OF OPERATION THEREOF

(75) Inventors: Boris E. Makutonin, Cincinnati, OH (US); Frank G. Oliverio, Cincinnati, OH (US)

(73) Assignee: R. A. Jones & Co. Inc., Crescent Springs, KY (US)

( * ) Notice: Subject to any disclaimer, the term of this patent is extended or adjusted under 35 U.S.C. 154(b) by 0 days.

(21) Appl. No.: 10/700,138

(22) Filed: Nov. 3, 2003

(65) Prior Publication Data

US 2004/0094531 A1 May 20, 2004

Related U.S. Application Data

(62) Division of application No. 09/704,686, filed on Nov. 3, 2000, now Pat. No. 6,657,165.

(51) Int. Cl.[7] .............................. H05B 3/02; B65B 51/00
(52) U.S. Cl. ....................... 219/244; 219/543; 156/499; 156/583.1
(58) Field of Search ................................. 219/243–244, 219/543, 388; 156/583.1, 583.2, 583.4, 499, 515; 53/370.7, 373.7, 375.9, 377.7; 338/307–309

(56) References Cited

U.S. PATENT DOCUMENTS

| | | | | | |
|---|---|---|---|---|---|
| 2,509,439 | A | * | 5/1950 | Langer | 156/498 |
| 2,606,987 | A | * | 8/1952 | Winstead | 219/543 |
| 2,689,803 | A | * | 9/1954 | Ackerman | 427/110 |
| 3,054,441 | A | * | 9/1962 | Abraham et al. | 156/515 |
| 3,506,771 | A | * | 4/1970 | Cole, Jr. | 373/134 |
| 5,415,724 | A | * | 5/1995 | Perrett | 156/583.2 |
| 5,475,199 | A | * | 12/1995 | Buchanan | 219/243 |
| 6,657,165 | B1 | * | 12/2003 | Makutonin et al. | 219/244 |

FOREIGN PATENT DOCUMENTS

| | | | |
|---|---|---|---|
| DE | 1565224 | * | 10/1970 |
| DE | 2524840 | * | 8/1976 |
| EP | 546495 | * | 6/1993 |
| GB | 2332844 | * | 6/1999 |

* cited by examiner

Primary Examiner—John A. Jeffery
(74) Attorney, Agent, or Firm—Wood, Herron & Evans LLP

(57) ABSTRACT

The invention is a sealing system and a method of operation thereof. A sealing system which forms spaced apart thermal seals along a moving at least one web (60) by contact of the moving the at least one web with heated portions (74) of sealing elements (56) mounted on a sealing wheel (50) during rotation in accordance with the invention includes seal forming elements (56) which peripherally contact the at least one web to form the thermal seals by heat transfer to the at least one web; and wherein each seal forming element has an outer section (62) on which is located at least one electrical heater (78), an inner section (64) which contacts the sealing wheel and an intermediate section (70) which includes thermal insulation (68) which insulates the outer section from the inner section.

38 Claims, 8 Drawing Sheets

SEALING SYSTEM FOR FORMING THERMAL SEALS AND METHODS OF OPERATION THEREOF

This is a Divisional application based on Ser. No. 09/704,686, filed Nov. 3, 2000, now U.S. Pat. No. 6,657,165 by Boris E. Makutonin et al and entitled SEALING SYSTEM FOR FORMING THERMAL SEALS AND METHODS OF OPERATION THEREOF, the priority of which is claimed.

BACKGROUND OF THE INVENTION

1. Field of the Invention

The present invention relates to machinery and processes for manufacturing spaced apart thermal seals in applications such as pouch-type bags in which metered quantities of substances, such as food stuffs, are sealed therein.

2. Description of the Prior Art

The Assignee of the present invention manufactures machinery for making thermally sealed pouch-type bags. Machines of this type are well known. A continuous web having the front and back sides of the bag printed thereon is folded in half and run over the outside periphery of a first sealing system to which the present invention relates in part. The sealing system has evenly spaced thermally actuated sealing elements mounted on the periphery of a rotating wheel which forms parallel spaced apart seals by melting a thermoplastic material coated on the inside of the web after the web has been folded in half. After the parallel seals are made by the sealing system, each bag in the web has been formed except for the closure of the top. After running across the sealing system, the continuous web with parallel spaced apart seals which define the opening of each bag is fed to a pouch filling station at which a metered quantity of substance, such as powered food, is placed inside the individual bags located along the continuous web as the bags at the pouch filling station rotate around the periphery thereof. After filling with the metered quantity of substance, the bags then pass to a second thermal sealing station which heat seals the top of each bag to close the food stuff or other material therein in a sanitary manner. Finally, the sealed bags, which are still part of the continuous web, pass to a cutting station at which a series of rotating knives cut the individual bags apart uniformly in the middle of the parallel spaced apart thermal seals which were formed by the first sealing system.

The Assignee of the present invention manufactures machines of the aforementioned type which operate at high processing speeds, such as up to 4000 linear inches per minute or higher, to make individual pouch-type bags from the moving web. High speed operation in machinery of this type is extremely important as a consequence of the economics of manufacturing products such as dry packaged foodstuffs. Any circumstance occurring during manufacturing of filled thermally sealed pouch-type bags which requires the line to be shut down has a serious effect on the productivity of the manufacturing operation.

Materials from which thermally sealed pouches are manufactured include paper, cellophane foil, metallized structures, polypropylene and other laminates of preprinted or unprinted stock.

In the prior art, two basic types of sealing systems, which typically operate with the axis of rotation of the sealing wheel of the sealing system being vertical, are known. These sealing systems are known as "drum" and "modular" sealing systems.

The drum style sealing system is a single piece of metal machined from a casting which has a calculated land diameter that is the heated surface contacting the moving web to form the spaced apart parallel seals. Drum style sealing systems have the disadvantage of not having an adjustable spacing between the parallel seals which define the width of the pouch-type bag. Behind each land and parallel thereto is a hole containing a tubular electric heater element. Drum style sealers work well once the substantial thermal mass of the machined casting has come up to operating temperature which is typically a temperature of 280° F. or above. The drum, as a consequence of its high thermal mass, will produce unacceptable seals if the continuously moving web has to be stopped for any reason. This high thermal energy of the drum at the point of contact of the lands with the web for a substantial period of time either causes the parallel seals to be destroyed because of the prolonged contact or the parallel seal grow to a greater width than desired which restricts the size of the bag. A reduced volume of the bag caused by wider seals either prevents the desired metered quantity of material from being placed inside the bag or worse, the spacing between the bags at the cutting station becomes out of synchronism with the spacing of the cutting knives causing severing of the web at spaced apart locations which do not correlate with the middle of the thermally formed seals which can cause the bags to have faulty seals or spill the contents thereof.

The modular sealing system is illustrated in FIG. 1. The modular style sealing system 10 includes a wheel having a stationary lower circular plate 12 and an upper rotating annular ring 14 to which individual seal forming elements 16 are mounted by threaded type connectors 17. The seal forming elements make peripheral contact with a continuous web 18 as illustrated in FIG. 2. The wheel of the sealing system 10 is driven by rotating shaft 18. Cooling air is blown from holes 19. The individual seal forming elements 16 may be moved radially in slots 20 to permit adjustment of the spacing between the parallel seals 24 by loosening and tightening of the connectors 17. Each of the sealing elements 16, like the aforementioned drum style sealer wheel, has a tubular electric heating element (not illustrated) mounted in a longitudinally extending hole in each seal forming element 16.

The modular style sealing system 10 is a substantial improvement over the drum style sealing system by permitting adjustability of the spacing between individual spaced apart seals 24 on the continuously moving web 18. The overall thermal mass of the sealing elements 16 results in a substantial variation in the temperature along the longitudinal dimension thereof. The modular style sealing system typically operates with a temperature differential along the longitudinal dimension between the top and bottom of the individual sealing elements 16 of 30° to 40° F. and between 30° to 50° F. between different sealing elements 16. In part, the difference in temperature along the longitudinal dimension of the sealing elements 16 during operation is caused by heat flow from the electrical heating element of the individual sealing elements 16 to the top rotating annular plate 14 during rotation and stoppage thereafter. In order to obtain a high quality seal across the length of a pouch-type bag, it is necessary to operate the modular sealing wheel at a temperature which, at its lowest point is a temperature such as 280° F., which can result in some of the individual sealing elements 16 operating at the center thereof, which are more thermally insulated than the top and bottom portions of the sealing wheel, at a temperature of at least 320° F.

As illustrated in FIG. 2, during normal operation, the continuous web 18 rolls across the periphery of the individual sealing elements 16. The sealing elements 16 have precisely chosen spacings therebetween so that each peripherally outwardly facing surface 22 contacts the continuous web 18 at the same place as the web moves around the periphery of the wheel. The result of the precise registration during moving of the continuous web 18 in contact with the outer surfaces 22 of each sealing element 16 is the formation of a straight uniform width seal 24 even though there is the aforementioned temperature variation of 30 to 40° F. during operation between the center of the individual heating elements and the ends thereof. Because of the high speed rotation of the web across the sealing wheel 10, there is a controlled short dwell time which produces uniformity in seal width, even though the aforementioned temperature variation exists.

However, if, for any reason the continuous movement of the web 18 has to be stopped, the higher operating temperature of the midpoint of the sealing elements 16, which have substantial thermal mass, causes the individual surfaces 22 to contact the continuous web 18 sufficiently long to produce a seal 26 which grows in width toward the midpoint. The wider seal 26, produced as a result of the longer contact time of the exterior surfaces 22 with the web 18 during stoppage, produces individual bags having an hour glass type interior shape which reduces the capacity of the bag to be filled. After the machine is again started, seals of the shape 26, when they pass to the filling station of the pouch-type bags, often prevent the precisely metered quantity of material, which is normally placed in the bags during continuous operation, from being placed in the individual pouch-type bags. As a result, the volume of material sealed in the bags is reduced and may vary. This can cause spillage of material because it is left over from the precisely metered quantity which is made available to be placed into the pouch-type bag and tends to fall from the elevated filling station. This is wasteful and further can require costly cleanup operations. Finally, the thermally sealed bags, as a result of having less material therein than the desired amount, may not register precisely with the downstream cutting knives at the cutting station which can result in the continuous web being severed at points which are not at the midpoint of the individual seals 26, resulting in total loss of the material.

Pouches having the hourglass interior, as illustrated in FIG. 2, are much more likely to cause jams in the feeding of the web 18, may cause stoppage of the processing and even breakage of the web. Rethreading of the web is a time consuming and costly process when stoppage of the manufacturing of individual pouches is taken into consideration. Finally, even if there is no appreciable spillage at the station which fills the bags and if the bags are properly severed, downstream quality control should reject the individual bags as not containing the correct weight of material.

The modular style sealer systems also have a large thermal mass which requires approximately 8–10 minutes to heat the sealer to the set point temperature at which thermal sealing is performed. This heat up time can result in a loss of 8,000–10,000 pouches given that machinery of this type is designed to operate at speeds of 1,000 pouches or higher per minute. Furthermore, when stoppage occurs, as illustrated in FIG. 2, it takes several minutes for the sealing system to cool down so that the web 18 will not be burned or produce the widened seals 26 which, in the past, in some applications, have required the blowing of cooling air from holes 19 in the lower circular plate 12 and is a significant cost to the manufacturer of pouch-type bags.

SUMMARY OF THE INVENTION

The present invention is an improved sealing system and process of operation thereof which eliminates the problems of the prior art. Sealing elements in accordance with the invention have faster heat up and cooling down times and consume less thermal energy than the sealing system of FIG. 2. Each seal forming element has a section on which at least one electrical heater is mounted, a mounting section at which the sealing elements are attached to upper and lower parts of the wheel or other mounting structure in non-rotary applications and a section including thermal insulation which insulates the section on which the at least one heater is mounted from the mounting section. The thermal insulation, which in a preferred application is an open slot, prevents substantial heat conduction to the mounting section, such as to the upper and lower parts of the sealing wheel, resulting in only the section on which the electrical heater is operated being operated at the high temperatures required to form thermal seals. As a result, a very quick heat up time of less than one minute is achieved to reach thermal sealing temperatures and furthermore, the cool down time, after a stoppage, is also substantially lessened. The formation of the seals 26 and operational difficulties of the prior art are eliminated.

A preferred embodiment of the invention utilizes thick film electrical resistances of known design preferably distributing the electrical resistance in sections of different resistance. The electrical resistance sections adjacent to the end parts of the outer section of the sealing element through which heat flows through an intermediate section to an inner mounting section may have a higher resistance and other sections of the electrical resistance, which are disposed adjacent to the thermal insulation, may have a lower electrical resistance. The overall distribution of the electrical resistance in sections or otherwise may be varied to suit any distribution of electrical resistance which compensates for heat loss through the mounting structure of the individual sealing elements to the wheel and/or processing conditions and applications to facilitate the making of different types of seals on different types of materials of different size and strength for different applications. For example, a rotary embodiment of the present invention, as described below, achieves only a 14° F. difference along the entire longitudinal length of the sealing element, while having the enhanced heat-up and cool-down lines and lower energy consumption. The electrical resistance may be distributed along the longitudinal dimension of a substrate on which the electrical resistance is located as a series of sections of electrical resistance having different resistance values as described above or in a smooth resistance gradient which changes progressively along the longitudinal dimension of the substrate on which the electrical resistance is located toward the midpoint or otherwise to suit diverse sealing applications.

In one preferred embodiment of the invention in which an inner mounting section of each seal forming element is joined to upper and lower parts of a sealing wheel which are separated on an axis of rotation of the wheel, the higher electrical resistance is located proximate to the upper and lower parts of the sealing wheel and the lower electrical resistance separates the higher electrical resistance proximate to the upper and lower parts. The higher electrical resistance proximate to the upper and lower parts of the sealing wheel compensates for the increased heat flow thereto as a consequence of heat flow-through two projections of the intermediate section of each sealing element, between which an open slot is disposed, separating the section on which the electrical resistance is located and the inner mounting section at the longitudinal ends of the sealing element. Preferably, the insulation contained in the intermediate section is the open slot which separates the two projections but the invention is not limited thereof.

The present invention has substantial advantages over the prior art. First, consistent and easy to change temperature profiles on the heating surface of each seal forming element and between individual sealing elements are achieved consequent from the use of heating elements made from film resistances which preferably are thick film resistances. Faster heat up of the seal forming elements is achieved at the start up of processing. Faster cool down to a set point temperature at stopping of the processing and faster heat up for restarting processing thereafter is achieved. The seal forming elements are readily washed down with cleaning solutions in view of the exterior mounting of the film resistances on the seal forming elements. The overall energy consumption of the sealing system is substantially lessened in view of the much smaller thermal mass of the section on which the film resistance heaters is located, which is the only part of the seal forming element which is substantially heated to produce the thermal seals, with the inner or mounting section of each seal forming element operating at temperatures low enough that they may be touched by an operator without being burned. The lower energy consumption lengthens the life of electrical controls mounted on the sealing system. Also, a lower profile is achieved which facilitates rethreading of the endless web. Additionally, each seal forming element is radially adjustable to vary the spacing between the spaced apart thermal seals.

In one preferred embodiment, a pair of film electrical resistances, which preferably are thick film resistances, are disposed on opposed surfaces of each seal forming element and a seal forming surface which contacts at least one moving web, is opposed to the thermal insulation and intersects the opposed surfaces.

In another preferred embodiment, a single film resistance, which preferably is a thick film resistance, is located on the seal forming surface of each seal forming element which contacts the at least one web on which the thermal seals are formed. An intermediate section of each seal forming element, which is a strip of insulation or an open slot, thermally isolates an inner section of each seal forming element which is connected to the sealing wheel from an outer section.

Additional embodiments of seal forming elements of the present invention have applications as linear non-rotating sealing elements. In these applications the film resistance, which preferably is a thick film resistance, is thermally isolated by insulation from a support. The thermal insulation between the film resistance and the support provides fast heat up and cooling down times and low energy consumption.

During operation of the sealing system in continuous processing of at least one web into pouch-type bags, temperature variation along the electrical heater may be less than 30° F., preferably is less than 15° F. and most desirably is less than 5° F.

Rotation of the sealing wheel to form thermal seals and movement of the at least one web may be stopped with the invention. While the at least one web contacts the periphery of the sealing elements with the electrical potential being turned off to stop heating, seals are achieved with the invention which are perpendicular to a longitudinal dimension of the at least one web and are straight and parallel which eliminates the problems of the thermal sealing systems of FIGS. 1 and 2. As a result, the filling of the pouch-type bags at a downstream filling station, does not have substantial spillage because the capacity of the pouch-type bags has not been reduced as with the prior art of FIG. 2. Furthermore, at the time of cutting the continuous web into pouch-type bags, there is no longer a problem of the bags being out of registration with the thermal seals resulting in spillage of materials in the bags. Stopping of the pouch-type bag forming system including the sealing system may be accomplished without having to rethread the at least one web. Improperly severed bags caused by each bag having a reduced amount of packaged material and the resultant loss of material does not occur. All of these benefits result in a higher throughput of individual bags.

A sealing system which forms spaced apart thermal seals along a moving at least one web by contact of the moving at least one web with heated portions of sealing elements mounted on a sealing wheel during rotation in accordance with the invention includes seal forming elements which peripherally contact the at least one web to form the thermal seals by heat transfer to the at least one web; and wherein each seal forming element has an outer section on which is located at least one electrical heater, an inner section which contacts the sealing wheel and an intermediate section which includes thermal insulation which insulates the outer section from the inner section. Each electrical heater may be comprised of an electrical resistance disposed along a longitudinal dimension of the outer section of the seal forming element, the electrical resistance being distributed along the longitudinal dimension with a higher electric resistance being adjacent to a part of the intermediate section through which heat flows to the inner section and a lower electrical resistance which is disposed adjacent to the thermal insulation of the intermediate section. The inner section of each seal forming element may be joined to upper and lower parts of the sealing wheel which are separated on an axis of rotation of the wheel; and the higher electrical resistance may be located proximate to the upper and lower parts of the wheel and the lower electrical resistance may separate the higher electrical resistance proximate to the upper and lower parts. Each seal forming element is radially adjustable to vary the spacing between the spaced apart thermal seals. A pair of film electrical resistances may be disposed on opposed surfaces of each outer section and a seal forming surface may touch the moving at least one web, may be opposed to the thermal insulation and may intersect the opposed surfaces of the outer section. Each electrical heater may be a film resistance which preferably is a thick film resistance. The outer section may be parallel to an axis of rotation of the sealing wheel and the electrical resistance may extend longitudinally along the outer section. A single film resistance, which preferably is a thick film resistance, may be located in the seal forming surface which contacts the moving at least one web.

A process for forming spaced apart thermal seals along a moving at least one web by contact of the moving at least one web with heated portions of sealing elements mounted on a sealing wheel during rotation having seal forming elements which peripherally contact the at least one web to form the thermal seals by heat transfer to the at least one web and wherein each seal forming element has an outer section at which is located at least one electrical heater, an inner section which contacts the sealing wheel and an intermediate section which includes thermal insulation which insulates the outer section from the inner section and each electrical heater is comprised of a film electrical resistance disposed along a longitudinal dimension of the outer section of the seal forming element, the electrical resistance being distributed along the longitudinal dimension with a higher electrical resistance being adjacent to a part of the intermediate section through which heat flows to the inner section and a lower electrical resistance which is disposed adjacent to the thermal insulation of the intermediate section in accordance with the invention includes applying an electrical potential to each electrical resistance to heat the seal forming elements at a point of moving contact with the at least one web to form the thermal seals on the moving at least one web. The inner section of each electrical heater may be joined to upper and lower parts of the wheel which are separated along an axis of rotation of the wheel and the higher electrical resistance may be located proximate to the upper and lower parts of the wheel and the lower electrical resistance may separate the higher electrical resistance proximate to the upper and lower parts; and during rotation of the sealing wheel to form the thermal seals a variation in temperature along a longitudinal dimension of the electrical heater during rotation may be less than 30° F. The variation in temperature may be preferably less than 15° F. and most preferably may be less than 5° F. During rotation of the wheel to form the thermal seals, rotation of the wheel and movement of the at least one web may be stopped while the at least one web contacts the periphery of the wheel, the electrical potential may be disconnected from the electrical resistance to stop heating and seals are produced which are perpendicular to a longitudinal dimension of the web which are straight and parallel.

A sealing system which forms spaced apart thermal seals along a moving at least one web by contact of the moving web with heated portions of sealing elements mounted on a sealing wheel during rotation in accordance with the invention includes seal forming elements which peripherally contact the at least one web to form the thermal seals by heat transfer; and wherein each seal forming element has an outer section on which is located at least one electrical heater, an inner section which contacts the sealing wheel and an intermediate section which includes thermal insulation which insulates the outer section from the inner section, and the intermediate section has two end projections which separate the outer section from the inner section, each electrical heater is comprised of a film electrical resistance disposed along a longitudinal dimension of the outer section of the seal forming element, the electrical resistance being distributed in a plurality of sections of different electrical resistance along the longitudinal dimension and a higher electrical resistance section is disposed at ends of the outer section and at least one lower electrical resistance section is disposed from the higher resistance sections to a midpoint between the ends. The film electrical resistance may be a thick film electrical resistance. The at least one lower electrical resistance section may include a plurality of lower electrical resistance sections which are disposed symmetrically about the midpoint. The plurality of lower electrical resistance sections may comprise a lowest electrical resistance section disposed symmetrically about the midpoint and pair of electrical resistance sections may be disposed between the higher electrical resistance sections and the lowest electrical resistance section. At least a pair of film resistances may be disposed on opposed surfaces of each outer section and a seal forming surface may touch the moving at least one web, may be opposed to the thermal insulation and may intersect the opposed surface of the outer section. A single film resistance, which preferably is a thick film resistance, may be located in the seal forming surface which contacts the at least one moving web.

A thermal sealing element in accordance with the invention includes a support; a film heating element having a resistance to which is applied electric current for generating heat to thermally seal film contacting the heating element; and insulation separating the film heating element from the support. The support may be a mounting member which attaches to a movable sealing system. The film resistance may have a thick film resistance; and the thick film resistance may have a substrate which is a metallic member which is joined to the insulation. The insulation may be a solid insulation layer which separates the film heating element from the support. The insulation may comprise a section having a slot providing an air gap between the film heating element and the support with the section having a pair of projections which separate the support from the film heating element and the support and which define ends of the air gap. The film resistance may vary along a length thereof. The film resistance may be comprised of a plurality of sections with at least two of the sections having a different resistance.

A sealing system which forms spaced apart thermal seals along at least one moving web by contact of the moving at least one web with heated portions of an outside periphery of a sealing wheel during rotation in accordance with the invention includes seal forming elements attached to the sealing wheel which peripherally contact the at least one web to form the thermal seals by heat transfer to the at least one web; and wherein each seal forming element has an outer section which peripherally contacts the at least one web and includes a film resistance electrical heater facing the at least one web and thermal insulation disposed between the outer section and the sealing wheel which insulates the outer section from the sealing wheel. The seal forming elements may comprise a first group which we parallel to an axis of rotation of the sealing wheel, and a second group which are disposed circumferentially on an outside periphery of the sealing wheel and are individually disposed between different pairs of adjacent seal forming elements of the first group. The first and second groups may be continuous and joined together. The film resistance may be a thick film resistance which varies along a longitudinal dimension thereof. The thick film resistance of each sealing element may be comprised of a plurality of sections of resistance with at least two of the sections being of a different resistance. The film resistance may be a thick film resistance which varies along a longitudinal dimension of at least one of the first and second groups. The thick film resistance may be comprised of a plurality of sections of resistance with at least two of the sections being of a different resistance in at least one of the first and second groups. The first group may include at least one section of resistance disposed between ends thereof which is wider than the resistance at the ends which produces a seal dividing a container defined between adjacent elements of the first group and an element of the second group into at least two sections with the at least one section of resistance which is wider between adjacent elements producing a seal defining an opening into one of the at least two sections.

A sealing system which forms spaced apart thermal seals between at least two webs by contact of the at least two webs with heated seal forming elements in accordance with the invention includes a pair of seal forming elements which contact opposed sides of the at least two webs to form the thermal seals by heat transfer to the at least one web; and wherein each of the pair of seal forming elements has a first section which contacts one of the at least two webs and includes a film resistance electrical heater facing one of the at least two webs and thermal insulation disposed between the first section and a second section which is spaced farther from the at least two webs than the first section with the seal forming elements having a closed periphery for containing a substance inside the closed periphery between the at least two webs. The resistance may be a thick film resistance and the insulation may be a plurality of slots located at different sides of each seal forming element with each slot providing an air gap between the film heating element and the second section. The resistance may be a thick film resistance and the insulation is a peripheral ring of thermal insulation extending around a periphery of each seal forming element.

THE DESCRIPTION OF THE PREFERRED EMBODIMENTS

The present invention is a sealing system and process for forming spaced apart thermal seals along a moving or intermittently stopped at least one web by contact of the moving at least one web with heated portions of sealing elements used in rotating and non-rotating applications.

Figure 1:
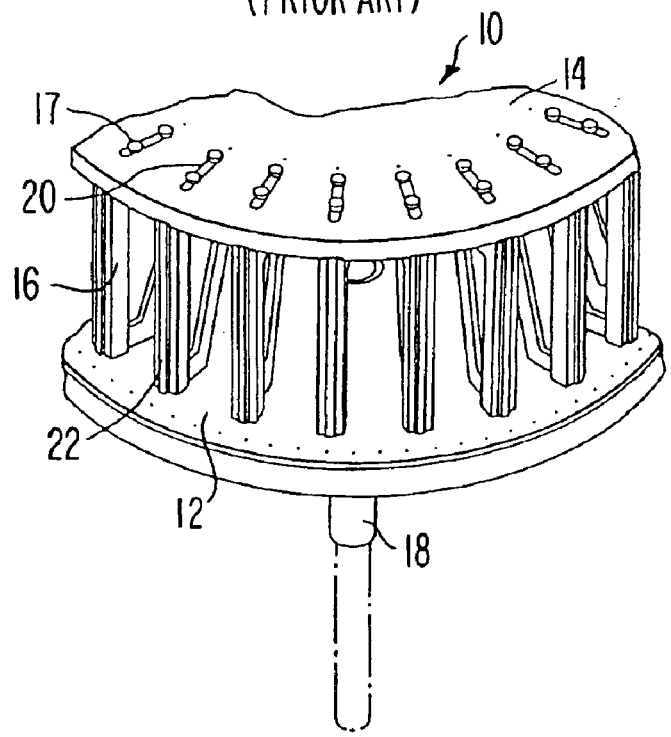
FIG. 1 illustrates a prior art modular sealing wheel of the type manufactured by the Assignee of the present invention.
Figure 2:
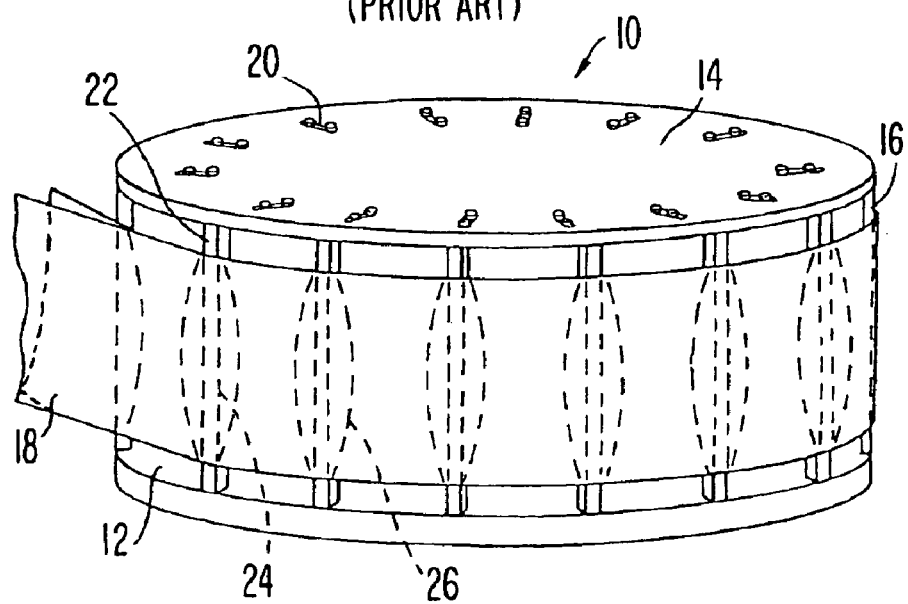
FIG. 2 illustrates the prior art sealing wheel of FIG. 1 during the formation of thermally sealed pouch-type bags both during normal operation when straight vertical seals are achieved and during stoppage during which seals continually increase in width toward the midpoint of the continuous web.

The overall sealing process of the embodiments of Fibs. 3–7 is in accordance with the prior art of FIG. 2 with the problems of the prior art discussed above having been eliminated.

The first embodiment of the invention is described with reference to FIGS. 3–5. The sealing system 49 includes sealing wheel 50 and a plurality of sealing elements 56. The rotating sealing wheel 50 is comprised of a lower circular plate 52 and an upper annular plate 54 to which are attached a plurality of the sealing elements 56 which are described in detail in conjunction with FIG. 5. Each sealing element 56 may be displaced along radial slots 58 to provide adjustment of spacing between the seals which are produced at parallel spaced apart locations on a moving at least one web 60. The at least one web 60 may be a single web folded in half or at least two separate webs. Each sealing element 56 is comprised of an outer section 62, at which is located at least one electrical heater, an inner section 64 which is attached to the lower circular plate 52 and the upper annular plate 54, and an intermediate section 66 which includes thermal insulation 68, which is preferably a slot machined in a corrosion resistant material, such as 430 type stainless steel, from which the sealing 56 elements are made to form an air gap which separates the outer section 62 and the inner section 64. The insulation is not limited to a slot, may be without limitation a solid material, such as ceramic, plastic, etc., and provides substantial thermal insulation between the outer section 62 and the inner section 64 to maintain the inner section 64 and the wheel 50 at an operating temperature which approaches the ambient temperature. The outer section 62 may be operated at temperatures of at least 280° F. while at the same time the inner section 64 operates at a temperature which permits touching without burning. The slot 68 provides substantial thermal insulation with two end projections 70 separating the outer section 62 from the inner section 64 which results in a substantially lower operating temperature in the sealing wheel than in the prior art. As an alternative, a solid thermal insulation strip such as, but not limited to, a ceramic, plastic, etc., may be utilized across the entire length of the longitudinal dimension of the sealing element. A thermocouple 112 may be located in one or more of the resistance sections to provide temperature feedback for the control system of FIG. 8.

In a preferred embodiment, each seal forming element 56 has a plurality electrical resistance sections coated on a opposed sides 72 which are orthogonal to the actual thermal sealing surface 74 that produces the seals 76.

The electrical resistance sections may be thick film electrical resistance heaters manufactured by Watlow Corporation of St. Louis, Mo. See the Oct. 21, 1999 article in *Machine Design*, at pages 76–78, for a description of the use of thick film resistance heaters of the type which are coated on the opposed surfaces 72 of each sealing element 56 which is incorporated herein by reference in its entirety.

Thick film resistance heaters are comprised of a sandwich of several different materials. These materials are in layers which include a substrate, a glassy dielectric material, a resistor and a final dielectric layer. The substrate thickness is chosen to be a function of the external loads and the stresses the heater experiences in use. A thick-film dielectric ink is deposited on the substrate in an even layer, dried at 120° C. and fired to 850° C. During firing, the glass frit suspended in the ink softens and reforms into a continuous layer forming an electrical barrier. The current-carrying layer, on the other hand, contains electrically conductive suspended metal oxides. When fired, the glass and metal oxide form a conductive resistance matrix. The circuit resistance and surface area determine the heat output which permits each of the electrical resistance sections 78 to have an electrical resistance which is chosen to produce the desired heating profile along the longitudinal dimension of the seal-forming surface 74 which, in accordance with the invention, is variable to suit different applications and the forming of seals of different size, strength and use.

For example, but without limitation, in one application of the present invention, the outer two sections 80 may have a resistance which produces 79.5 watts of heat when electrical potential is applied across the entire resistance. The higher heat output of the outer sections 80 is required to maintain a relatively uniform operating temperature along the longitudinal dimension of the sealing element 56 as a consequence of the greater heat loss occurring from heat flow through the perpendicular projections 70. The inner electrical resistance sections 82 may produce 48 watts of heat and the inner central section 84, which is split by the midpoint of the sealing element 56, may produce 45 watts of heat. The electrical resistances are directly proportional to the generation of heat by the sections with the highest values at the ends of the individual seal-forming elements 56 and lower values at the midpoint which provides compensation for the aforementioned heat loss to the rotating lower circular plate 52 and the upper annular plate 54. In comparison to the prior art, a smaller heat variation occurs along the longitudinal dimension of the individual sealing elements and between different sealing elements which produces highly uniform seal widths, even when the sealing wheel is stopped. Additionally, the thermal isolation of the outer section 62 from the inner section 64 provided by thermal insulation such as, but not limited to, the insulating slot 68 causes much quicker heat-up and cool-down cycles to be achieved and a smaller consumption of electrical energy resulting in the aforementioned advantages.

The sealing system of the present invention may be operated in a vertical mode as shown or in a horizontal mode without departing from the invention. While a preferred application of the present invention is for the making of pouch-type bags, the present invention is not limited thereto.

Figure 4:
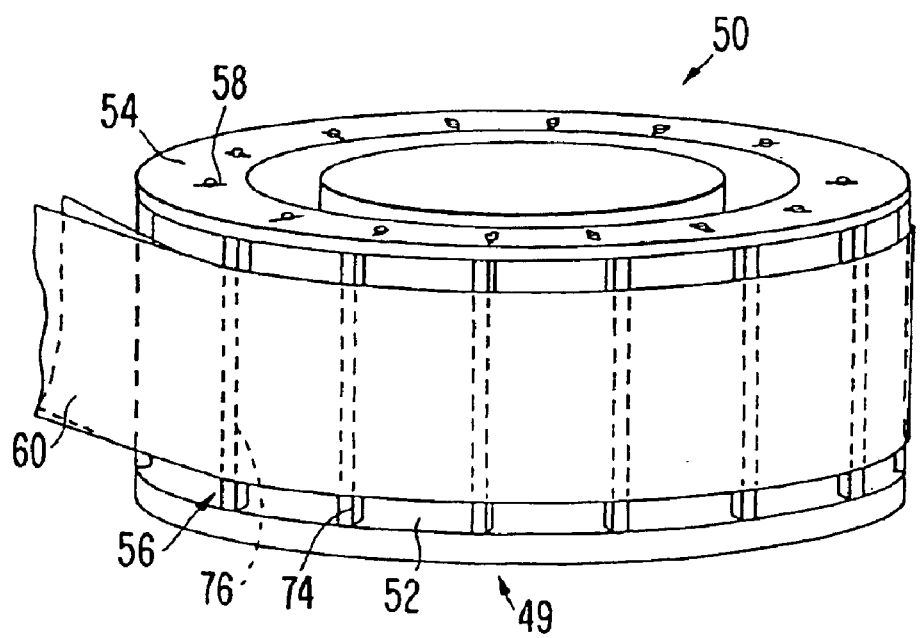
FIG. 4 illustrates the embodiment of FIG. 3 during the forming of thermally sealed pouch-type bags both during rotation of the sealing wheel and during stoppage.

During the operation of the embodiment as illustrated in FIG. 4, the continuous at least one web 60, during normal operation, rotates rapidly across the spaced-apart sealing elements 56 to form parallel uniformly spaced seals 76. However, at a time of stopping of the wheel and the other processes in the system for any reason, the continuous dwell of the at least one web 60 on the heated seal-forming surface 74 of the peripherally mounted elements 56 will not result in seals of the nature of seals 26 in FIG. 2. Normally, at stopping of the wheel, the electrical potential produced by the power supply is disconnected from the electric resistance of each of the sealing elements 56 which results in a rapid uniform cool-down across the longitudinal length of the individual sealing elements resultant from the relatively uniform operation temperature of the sealing elements and the small thermal mass. Burn-through or seals of non-uniform width which characterize the prior arts is avoided.

Figure 5:
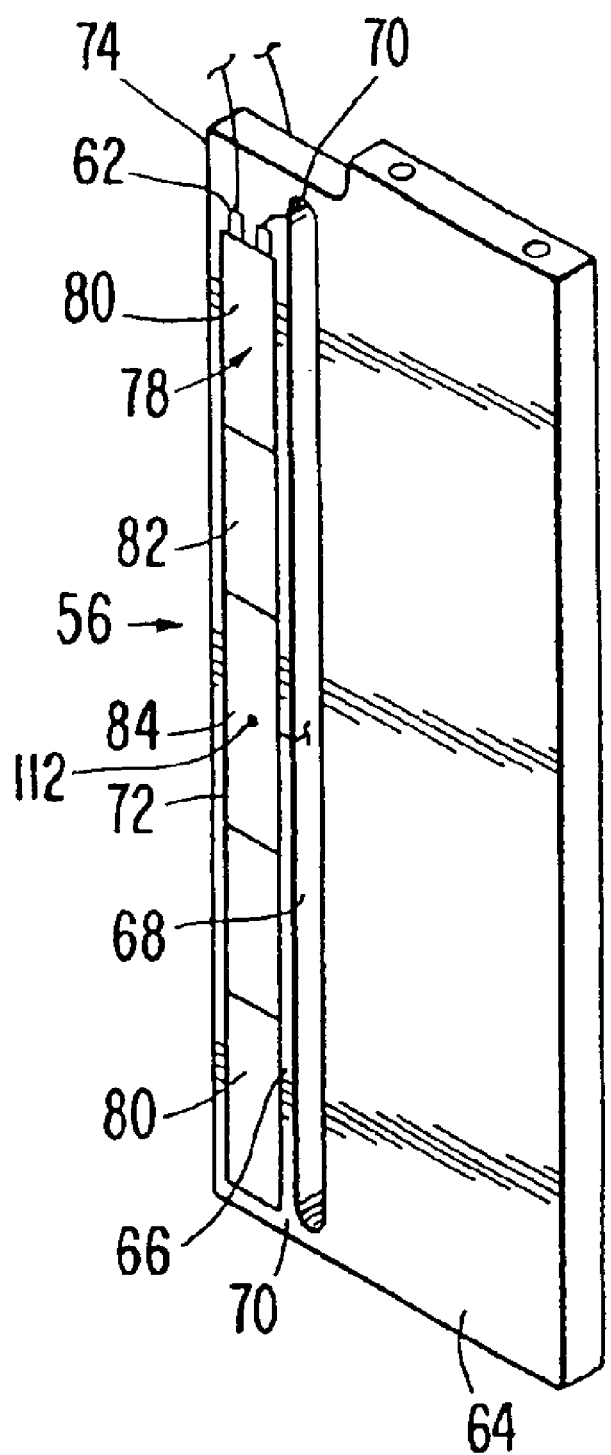
FIG. 5 illustrates a preferred embodiment of the individual sealing elements of the embodiment of FIGS. 3 and 4 in accordance with the present invention.
Figure 6:
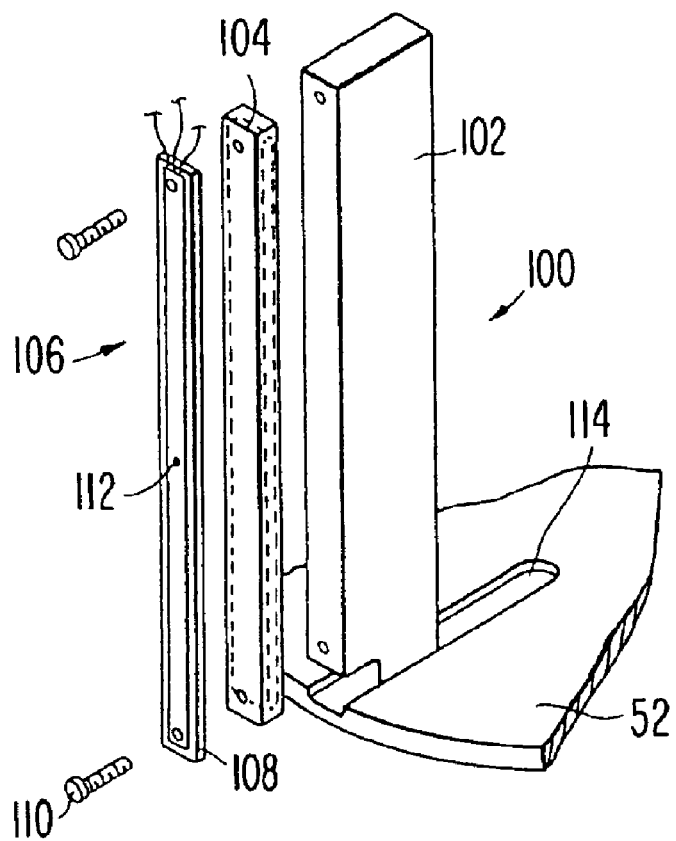
FIG. 6 illustrates another preferred embodiment of the individual sealing elements in accordance with the present invention.

FIG. 6 illustrates another preferred embodiment of individual sealing elements 100 in accordance with the present invention. The individual sealing elements 100 are peripherally mounted to a sealing wheel in the same manner as the sealing elements 56 of FIG. 5. The sealing elements 100 are comprised of a mounting land 102, insulation 104 and a heating element 106 including a thick film resistance as described above. The insulation may be a solid material or a slot as indicated by the dotted line. The heating element 106, without limitation, may be of the same construction as the heater comprised of electrical resistance sections 78 of FIG. 5. The electrical resistance sections (not illustrated) are formed on a substrate 108 which may be a layer of stainless steel or other material. Fasteners 110 connect the heating element 106, insulation 108, and the mounting land 102 together. A thermocouple 112 is fabricated into the multilayer structure of the thick film resistance heating sections of the heating element 106 to provide temperature feedback information to be used in temperature control as described below in conjunction with FIG. 8. The sealing elements 100 are movable radially within slot 114 of the lower circular plate 52 and are attached to the upper annular plate (not illustrated) by fasteners (not illustrated) in the same manner as FIGS. 3–5 to set the distance between the individual sealing elements.

Figure 3:
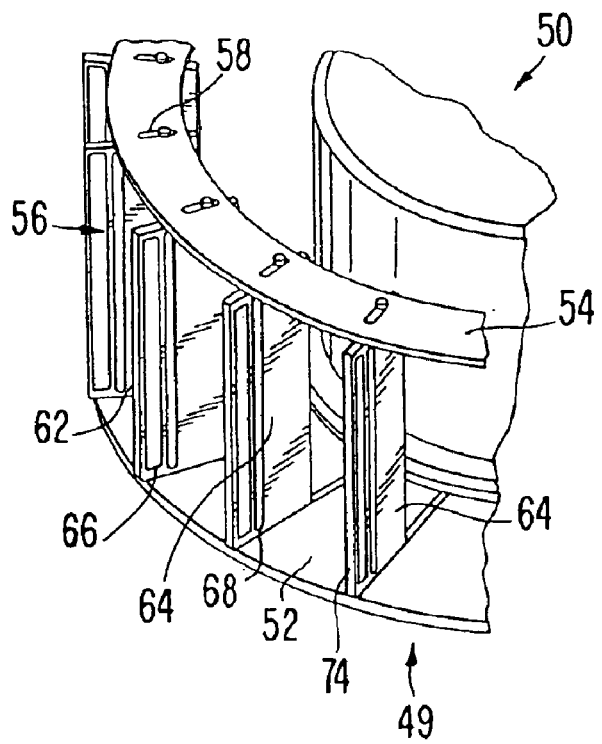
FIG. 3 illustrates a partial perspective view of a preferred embodiment of the present invention.

The sealing elements 100 differ from the sealing elements 56 of FIGS. 3–5 principally in that the electrical heater 106 is mounted on the outer peripheral surface, which directly contacts the moving web in the same manner, as illustrated in FIG. 4, instead of as in FIG. 4 of having two electrical resistance sections 78 on opposed surfaces 72 of the outer section 62.

Figure 7:
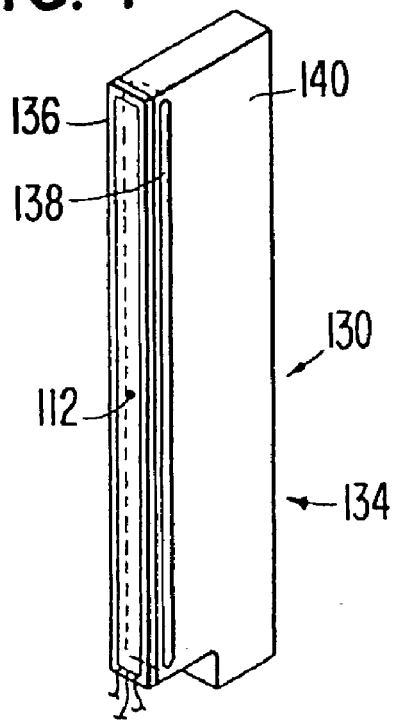
FIG. 7 illustrates another embodiment of the individual sealing elements in accordance with the present invention.

FIG. 7 illustrates another embodiment 130 of a sealing element which performs the same function as the sealing elements 56 and 100 described above. The sealing element 130 differs from the sealing elements 56 in that the thick film heating element 132, which may be identical in construction to the thick film heating elements used in the sealing elements 56, is formed on the outer peripheral surface 136 of land 134. The outer peripheral surface 136 is a substrate for the resistance sections of the heating element 132. Intermediate insulation in the form of slot 138 forms an air gap which thermally isolates the outer peripheral portion of the sealing element 130 including peripheral surface 136 from the inner support 140 of land 134. Thermocouple 112 functions in the same manner as the thermocouple 112 of the sealing elements 56 and 100 described above in conjunction with FIGS. 34. The mounting of the sealing element 130 is identical to sealing elements 56 and 100 described above.

Figure 8:
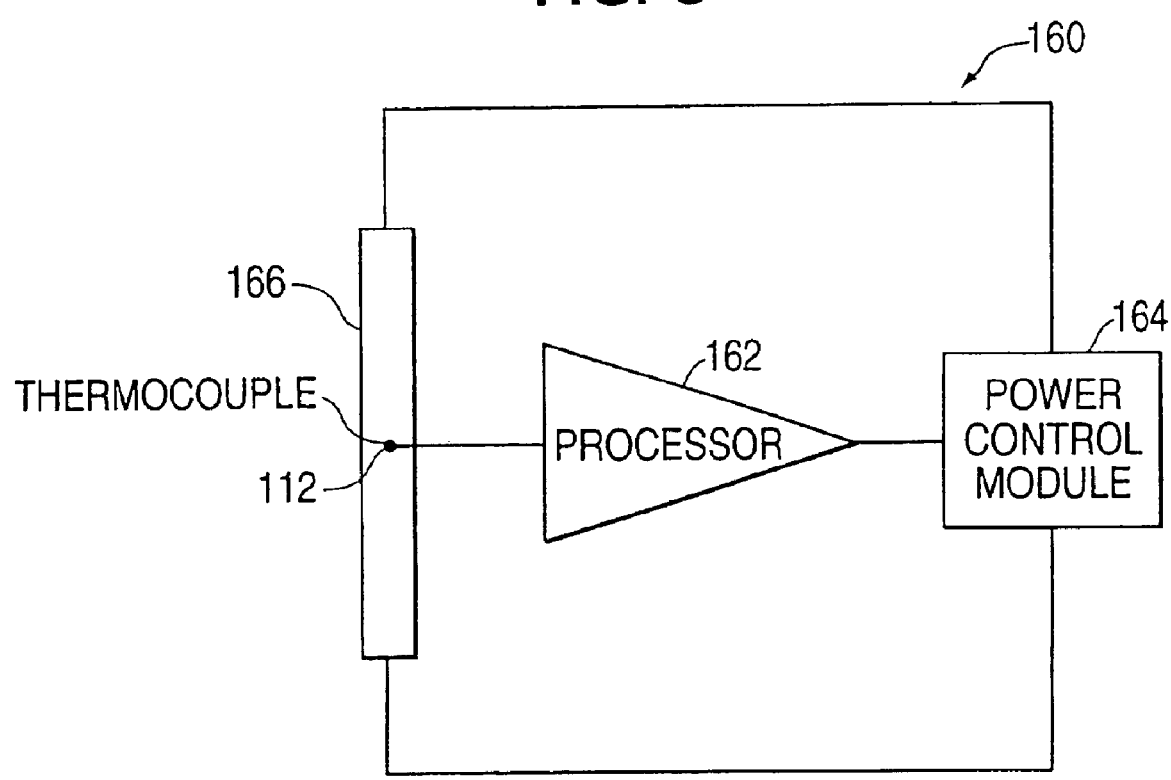
FIG. 8 illustrates a schematic of a temperature control system for the sealing elements of the present invention.

FIG. 8 illustrates a temperature control system 160 which maintains a set temperature point in the operation of the electrical heaters of FIGS. 5–7 and may be used to control the electrical heaters for the embodiments described below. The thermocouple 112 of FIGS. 5–7 provides temperature feedback to processor 162 which provides a control signal to power control module 164 of conventional construction which controls the electrical potential applied across the electrical heater 166 which is preferably a thick film resistance as described above with respect to FIGS. 5–7 and the embodiments described below and represents each of the film type resistances of the sealing elements of the different embodiments of the invention.

Figure 9:
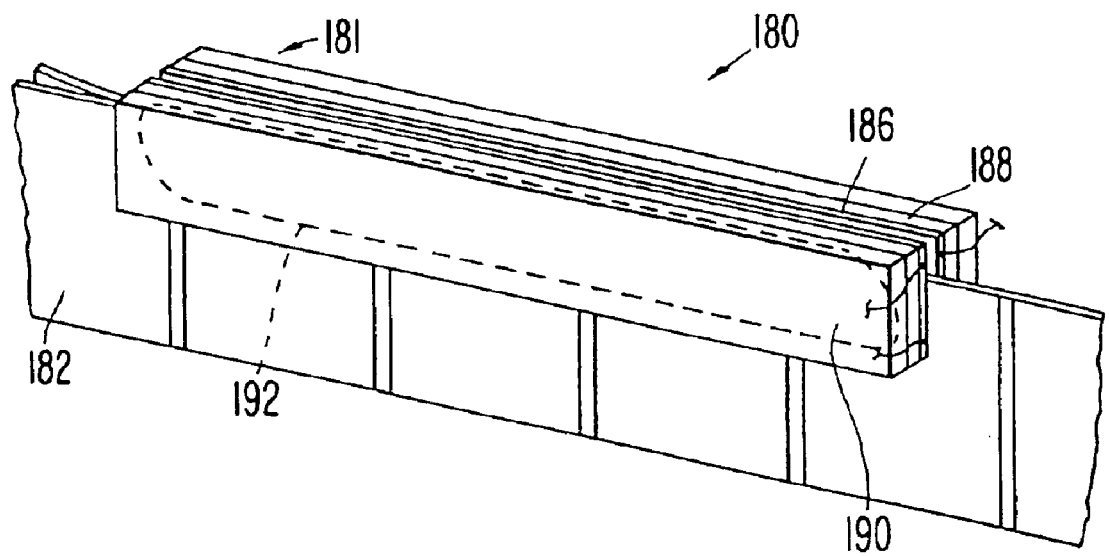
FIGS. 9 and 10 illustrate another embodiment of the present invention for forming end seals of pouch-type seals of the present invention on at least one continuously moving web.
Figure 10:
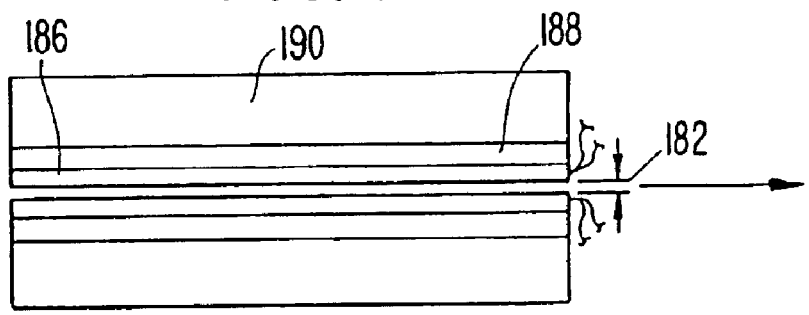

FIGS. 9 and 10 illustrate another embodiment 180 of a pair of sealing elements 181 in accordance with the present invention for forming end seals on at least a pair of moving webs 182 such as, but not limited to, the moving webs formed by the embodiments of FIGS. 3–7. Each sealing element 181 is comprised of a film resistance 186, which is preferably a thick film resistance as described above. An insulating layer 188 thermally isolates the heater 186 from the support 190 which may be made of stainless steel or other materials. The insulation 188 may be either an insulating material such as, but not limited to, ceramic or, as indicated by the dotted line 192, a slot such as in the embodiments of FIGS. 3–5 and 7. The construction of the thick film resistance 186 is in accordance with the process described above and is typically formed on a substrate such as stainless steel on which the multiple layer construction described above is deposited followed by the formation of the insulating layer 188 on the substrate for the electrical heater 186. It should be understood that the detail of the substrate and the multiple layers which comprise the heater 186 have not been illustrated in view of their having been described above. The sealing elements 181 of FIGS. 9 and 10 are designed to operate in a continuous mode and may be the end sealer for pouch-type bags after they have been manufactured with the system of FIGS. 3–7 and further filled with material which is not illustrated as being contained within the pouch-type bags formed from the at least one web 182.

Figure 11:
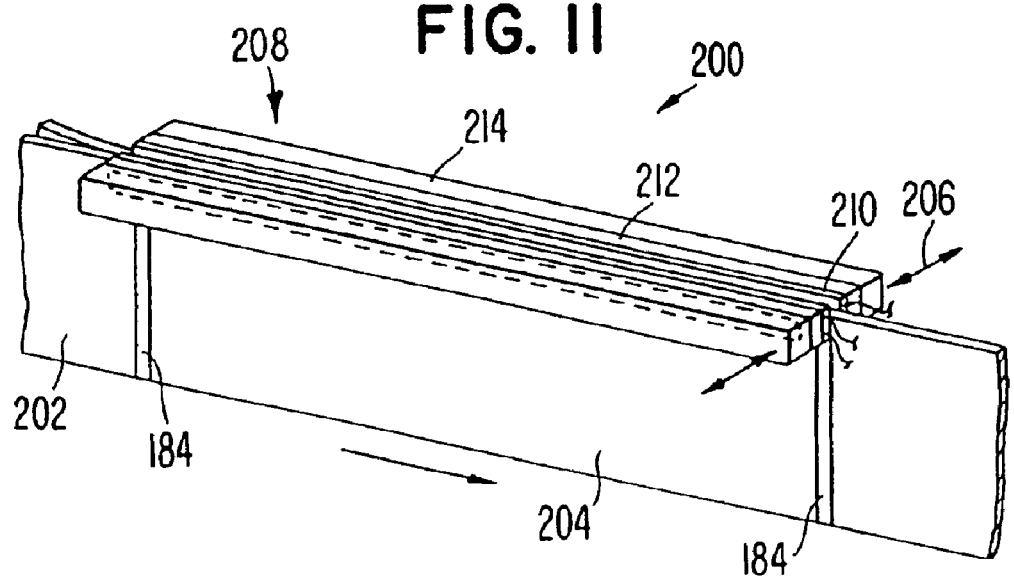
FIG. 11 illustrates another embodiment of the present invention for forming end seals on at least one intermittently moving web.

FIG. 11 illustrates another embodiment 200 of the present invention which operates to form end seals on an intermittently moving at least one web 202 which has spaced apart vertical seals 184. Each sealing element 208 is reciprocated orthogonally to the plane of the pouch-type bags 204 as indicated by directional arrows 206 by a translating mechanism which is conventional and is not illustrated. It should be understood that the device of FIG. 11 is known in the prior art except for the construction of sealing elements 208 which have a similar construction to the sealing elements 181 of FIG. 9. The inner heating element 210 has a construction in accordance with the heating element 186 of FIG. 9; the insulation 212 has a construction in accordance with the insulation 188 of FIG. 9; and the support 214 has a construction in accordance with the support 190 of FIG. 9. The operation of the sealing elements 208 is intermittent with the web 202 being indexed to a stopped position as shown in FIG. 11, followed by the movement of the pair of opposed sealing elements 208 inward to contact the stopped at least one web 202 and followed by formation of a thermoplastic or thermally activated seal.

Figure 12:
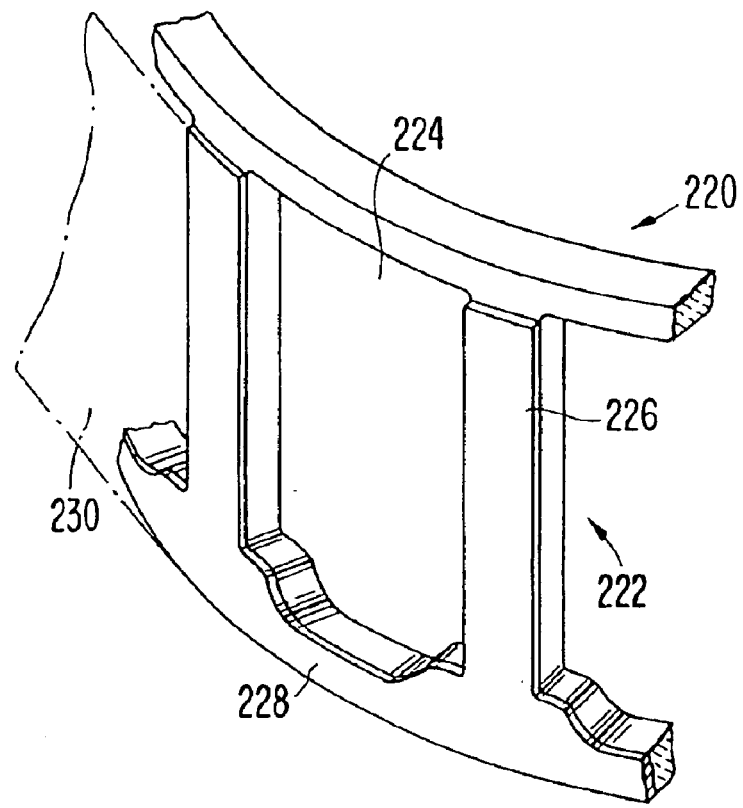
FIG. 12 illustrates an embodiment of the present invention which uses a sealing wheel to simultaneously form side seals and an end seal on pouch-type bags.

FIG. 12 illustrates another embodiment 220 of the present invention which includes a sealing wheel 222 having cutout sections 224 which may be cut, without limitation, with a laser. The sealing wheel 222, which remains after the cutout sections 224 have been removed, functions as a support and substrate for the deposition of thick film electric resistance heaters 226 and 228 of the same type as described above for forming vertical seals and a bottom seal on at least one web 230 as the at least one web contacts the outer layer of the thick film resistance heaters 226 and 228 to produce vertical seals and the bottom seal. The sealing wheel 222 has deposited on the outer surfaces a solid insulating material (not illustrated), such as ceramic or plastic but not limited thereto, for providing thermal isolation between the remaining portion after cutout of the sealing wheel and the outer thick film resistance heaters 226 and 228 of the above construction which utilizes the insulating layer as the substrate thereof. The resistance of the thick film heaters 226 and 228 is in sections as described above or varied in another manner. The resistance is chosen to provide uniform width vertical seals and strengthened seals along the bottom at the point of intersection between the vertical seals and the end seal which is depicted in FIG. 12 as a wider seal at the bottom.

Figure 13:
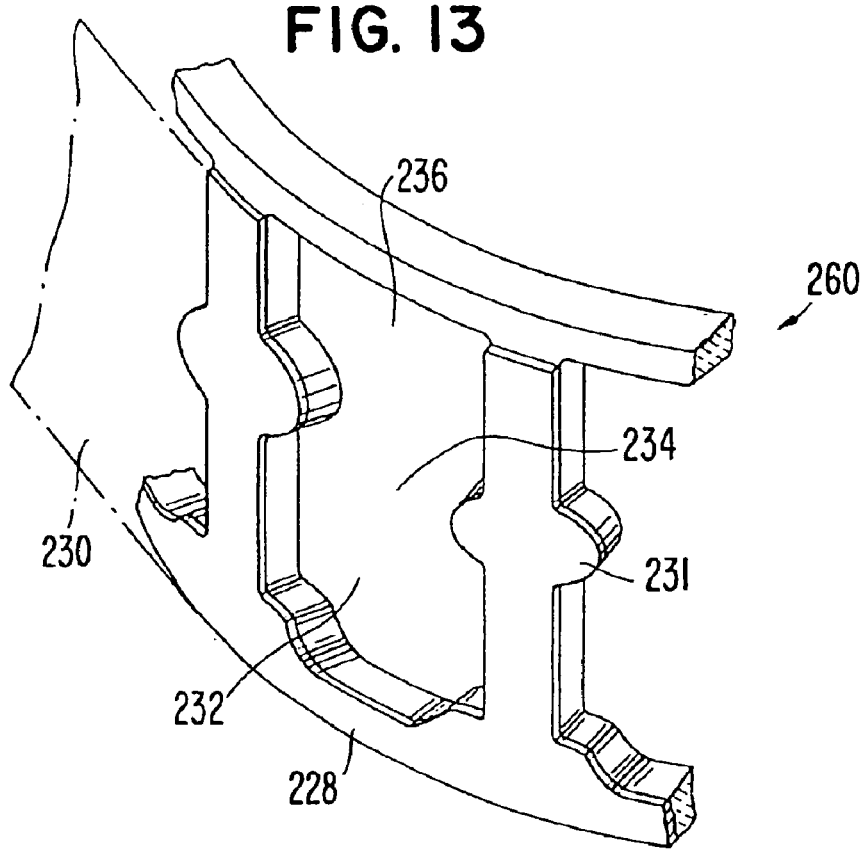
FIG. 13 illustrates an embodiment of the present invention which uses a sealing wheel to simultaneously form side seals and end seal and at least one intermediate seal of increased width for dividing pouch-type bags into multiple compartments for later sealing different substances into the multiple components.

FIG. 13 illustrates another embodiment 260 of the present invention which is identical to the embodiment of FIG. 12 except that the intermediate part of the vertical seals has a widened portion 231 which divides the pouch-type bag formed by the lower seal and the two vertical seals into a lower container 232 for receiving a first substance through narrowed neck 234 and an upper container 236 which is subsequently sealed on the top after the neck 234 is closed by a thermal seal (not illustrated) connecting the narrowed neck and the upper container 236 is filled with a second material. An example of such a pouch-type package is for the containing of shampoo and conditioner.

It should be understood that the electrical resistance of the thick film resistance heaters is chosen to meet the requirements of forming sturdy seals between the at least one web 230 or between folded portions thereof of variable width and strength. As a result, the resistance at particular parts of the resistance heaters 226 and 228 is chosen in sections or otherwise to accomplish the use and strength requirements of the pouch-type packages.

Figure 14:
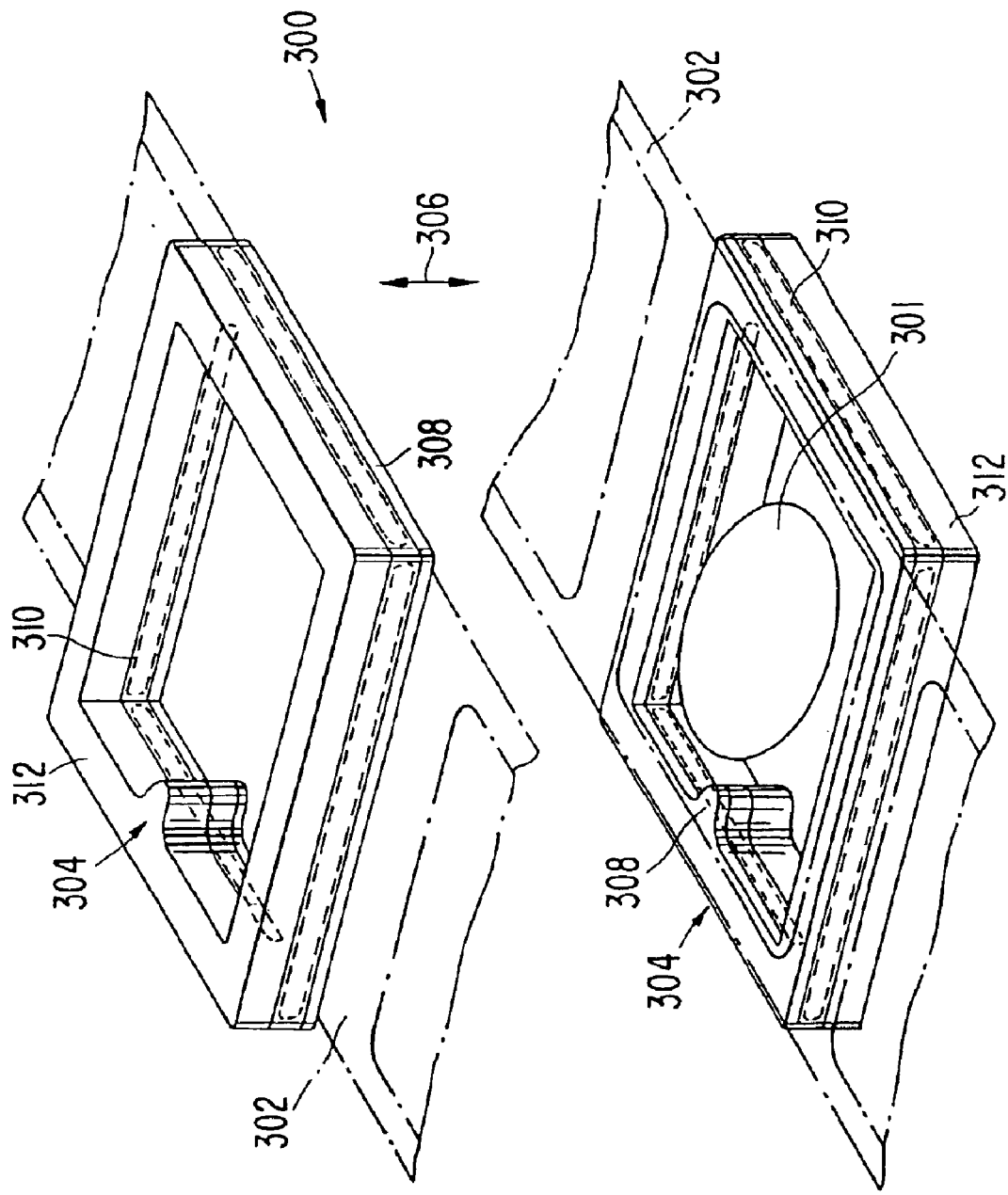
FIG. 14 illustrates another embodiment of the present invention.

FIG. 14 illustrates another embodiment 300 of the present invention for packaging items, such as tablet 301, between a pair of webs 302. A pair of sealing elements 304 are reciprocated as indicated by arrows 306 to thermally seal two webs 302 together peripherally along continuous thick film resistance 308, which contacts the two webs 302 located above and below the tablet 301 or other item to be sealed. The layered construction of the individual sealing elements 304 is similar to the other sealing elements described above in that the peripheral film resistance 308 is formed preferably as a thick film resistance as described above on a substrate which is insulated by an insulating layer 310 from support 312. The insulating material 310 may be solid as described above or a slot as indicated by the dotted line. The continuous periphery of the thick film resistance 308 completely thermally seals the two webs 302 around the item to be encapsulated.

While the invention has been described in terms of its preferred embodiments, it should be understood that numerous modifications may be made thereto without departing from the spirt and scope of the present invention. It is intended that all such modifications fall within the scope of the appended claims.

What is claimed is:

1. A sealing system which forms spaced apart thermal seals along at least one moving web by contact of the moving at least one web with heated portions of sealing elements mounted on a sealing wheel during rotation comprising:

seal forming elements which peripherally contact the at least one web to form the thermal seals by heat transfer to the at least one web; and wherein each seal forming element has an outer section, an inner section which contacts the sealing wheel and an intermediate section which includes thermal insulation which thermally insulates the outer section from the inner section; and an electrical heater wholly disposed on each outer section for heating said outer section to form seals in said web contacting said outer sections.

2. A sealing system in accordance with claim 1 wherein:
   each seal forming element is radially adjustable to vary the spacing between the spaced apart thermal seals.

3. A sealing system in accordance with claim 2 wherein:
   each electrical heater comprises a film electrical resistance.

4. A sealing system in accordance with claim 2 wherein:
   the outer section is parallel to an axis of rotation of the sealing wheel and the electrical heater extends longitudinally along the outer section.

5. A sealing system in accordance with claim 2 wherein:
   the electrical heater is a film resistance disposed on a surface of the outer section which contacts the at least one web.

6. A sealing system in accordance with claim 1 wherein:
   each electrical heater comprises a film electrical resistance.

7. A sealing system in accordance with claim 6 wherein:
   the outer section is parallel to an axis of rotation of the sealing wheel and each electrical resistance extends longitudinally along the outer section.

8. A sealing system in accordance with claim 1 wherein:
the outer section is parallel to an axis of rotation of the sealing wheel and the electrical heater extends longitudinally along the outer section.

9. A sealing system in accordance with claim 1 wherein:
the electrical heater is a film resistance disposed on a surface of the outer section which contacts the at least one web.

10. A sealing system which forms spaced apart thermal seals along at least one moving web by contact of the moving at least one web with heated portions of an outside periphery of a sealing wheel during rotation comprising:
seal forming elements attached to the sealing wheel which peripherally contact the at least one web to form the thermal seals by heat transfer to the at least one web; and wherein
each seal forming element has an outer section which peripherally contacts the at least one web and includes a film resistance electrical heater facing the at least one web and thermal insulation disposed between the outer section and the sealing wheel which insulates the outer section from the sealing wheel.

11. A sealing system in accordance with claim 10 wherein:
the seal forming elements comprise a first group which are parallel to an axis of rotation of the sealing wheel, and
a second group which are disposed circumferentially on an outside periphery of the sealing wheel and are individually disposed between different pairs of adjacent seal forming elements of the first group.

12. A sealing system in accordance with claim 11 wherein:
the first and second groups are continuous and joined together.

13. A sealing system in accordance with claim 12 wherein:
the film resistance is a thick film resistance which varies along a longitudinal dimension of at least one of the first and second groups.

14. A sealing system in accordance with claim 13 wherein:
the thick film resistance is comprised of a plurality of sections of resistance with at least two of the sections being of a different resistance in at least one of the first and second groups.

15. A sealing system in accordance with claim 14 wherein:
the first group includes at least one section of resistance disposed between ends thereof which is wider than the resistance at the ends which produces a seal dividing a container defined between adjacent elements of the first group and an element of the second group into at least two sections with the at least one section of resistance which is wider between adjacent elements producing a seal defining an opening ink one of the at least two sections.

16. A sealing system in accordance with claim 13 wherein:
the first group includes at least one section of resistance disposed between ends thereof which is wider than the resistance at the ends which produces a seal dividing a container defined between adjacent elements of the first group and an element of the second group into at least two sections with the at least one section of resistance which is wider between adjacent elements producing a seal defining an opening into one of the at least two sections.

17. A sealing system in accordance with claim 12 wherein:
the first group includes at least one section of resistance disposed between ends thereof which is wider than the resistance at the ends which produces a seal dividing a container defined between adjacent elements of the first group and an element of the second group into at least two sections with the at least one section of resistance which is wider between adjacent elements producing a seal defining an opening into one of the at least two sections.

18. A sealing system in accordance with claim 11 wherein:
the film resistance is a thick film resistance which varies along a longitudinal dimension of at least one of the first and second groups.

19. A sealing system in accordance with claim 18 wherein:
the thick film resistance is comprised of a plurality of sections of resistance with at least two of the sections being of a different resistance in at least one of the first and second groups.

20. A sealing system in accordance with claim 19 wherein:
the first group includes at least one section of resistance disposed between ends thereof which is wider than the resistance at the ends which produces a seal dividing a container defined between adjacent elements of the first group and an element of the second group into at least two sections with the at least one section of resistance which is wider between adjacent elements producing a seal defining an opening into one of the at least two sections.

21. A sealing system in accordance with claim 18 wherein:
the first group includes at least one section of resistance disposed between ends thereof which is wider than the resistance at the ends which produces a seal dividing a container defined between adjacent elements of the first group and an element of the second group into at least two sections with the at least one section of resistance which is wider between adjacent elements producing a seal defining an opening into one of the at least two sections.

22. A sealing system in accordance with claim 11 wherein:
the first group includes at least one section of resistance disposed between ends thereof which is wider than the resistance at the ends which produces a seal dividing a container defined between adjacent elements of the first group and an element of the second group into at least two sections with the at least one section of resistance which is wider between adjacent elements producing a seal defining an opening into one of the at least two sections.

23. A sealing system in accordance with claim 10 wherein:
the film resistance is a thick film resistance which varies along a longitudinal dimension thereof.

24. A sealing system in accordance with claim 23 wherein:
the thick film resistance of each sealing element is comprised of a plurality of sections of resistance with at least two of the sections being of a different resistance.

25. A sealing system in accordance with claim 24 wherein:
the first group includes at least one section of resistance disposed between ends thereof which is wider than the resistance at the ends which produces a seal dividing a container defined between adjacent elements of the first group and an element of the second group into at least two sections with the at least one section of resistance which is wider between adjacent elements producing a seal defining an opening into one of the at least two sections.

26. A sealing system in accordance with claim 23 wherein:
the first group includes at least one section of resistance disposed between ends thereof which is wider than the resistance at the ends which produces a seal dividing a container defined between adjacent elements of the first group and an element of the second group into at least two sections with the at least one section of resistance which is wider between adjacent elements producing a seal defining an opening into one of the at least two sections.

27. A sealing system in accordance with claim 10 wherein:
the film resistance is a thick film resistance which varies along a longitudinal dimension of at least one of the first and second groups.

28. A sealing system in accordance with claim 27 wherein:
the thick film resistance is comprised of a plurality of sections of resistance with at least two of the sections being of a different resistance in at least one of the first and second groups.

29. A sealing system in accordance with claim 28 wherein:
the first group includes at least one section of resistance disposed between ends thereof which is wider than the resistance at the ends which produces a seal dividing a container defined between adjacent elements of the first group and an element of the second group into at least two sections with the at least one section of resistance which is wider between adjacent elements producing a seal defining an opening into one of the at least two sections.

30. A sealing system in accordance with claim 27 wherein:
the first group includes at least one section of resistance disposed between ends thereof which is wider than the resistance at the ends which produces a seal dividing a container defined between adjacent elements of the first group and an element of the second group into at least two sections with the at least one section of resistance which is wider between adjacent elements producing a seal defining an opening into one of the at least two sections.

31. A sealing system which forms spaced apart thermal seals between at least two webs by contact of the at least two webs with heated seal forming elements comprising:
a pair of seal forming elements which contact opposed sides of the at least two webs to form the thermal seals by heat transfer to the at least one web; and wherein
each of the pair of seal forming elements has a first section which contacts one of at least two webs and includes a film resistance electrical heater facing one of the at least two webs and thermal insulation disposed between the first section and a second section which is spaced farther from the at least two webs than the first section with the seal forming elements having a closed periphery for containing a substance inside the closed periphery between the at least two webs.

32. A sealing system in accordance with claim 31 wherein:
the resistance is a thick film resistance and the insulation is a plurality of slots located at different sides of each seal forming element with each slot providing an air gap between the film heating element and the second section.

33. A sealing system in accordance with claim 31 wherein:
the resistance is a thick film resistance and the insulation is a peripheral ring of thermal insulation extending around a periphery of each seal forming element.

34. A sealing system which forms spaced apart thermal seals along at least one moving web by contact of the moving at least one web with heated portions of sealing elements mounted on a sealing wheel during rotation comprising:
seal forming elements which peripherally contact the at least one web to form the thermal seals by heat transfer to the at least one web;
each seal forming element having an outer section, on which is located at least one electrical heater, an inner section which contacts the sealing wheel and an intermediate section which includes thermal insulation which thermally insulates the outer section from the inner section;
each electrical heater being comprised of an electrical resistance disposed along a longitudinal dimension of the outer section of the seal forming element, the electrical resistance being distributed along the longitudinal dimension with a higher electric resistance being adjacent to a part of the intermediate section through which heat flows to the inner section and a lower electrical resistance which is disposed adjacent to the thermal insulation of the intermediate section; and wherein
the electrical heater is a film resistance disposed on a surface of the outer section which contacts the at least one web.

35. A sealing system which forms spaced apart thermal seals along at least one moving web by contact of the moving at least one web with heated portions of sealing elements mounted on a sealing wheel during rotation comprising:
seal forming elements which peripherally contact the at least one web to form the thermal seals by heat transfer to the at least one web;
each seal forming element having an outer section, on which is located at least one electrical heater, an inner section which contacts the sealing wheel and an intermediate section which includes thermal insulation which thermally insulates the outer section from the inner section;
each electrical heater being comprised of an electrical resistance disposed along a longitudinal dimension of the outer section of the seal forming element, the electrical resistance being distributed along the longitudinal dimension with a higher electric resistance being adjacent to a part of the intermediate section through which heat flows to the inner section and a lower electrical resistance which is disposed adjacent to the thermal insulation of the intermediate section;
the inner section of each seal forming element is joined to upper and lower parts of the sealing wheel which are separated on an axis of rotation of the wheel;

the higher electrical resistance is located proximate to the upper and lower parts of the wheel and the lower electrical resistance separates the higher electrical resistance proximate to the upper and lower parts; and wherein the electrical heater is a film resistance disposed on a surface of the outer section which contacts the at least one web.

36. A sealing system which forms spaced apart thermal seals along at least one moving web by contact of the moving at least one web with heated portions of sealing elements mounted on a sealing wheel during rotation comprising:

seal forming elements which peripherally contact the at least one web to form the thermal seals by heat transfer to the at least one web;

each seal forming element having an outer section, on which is located at least one electrical heater, an inner section which contacts the sealing wheel and an intermediate section which includes thermal insulation which thermally insulates the outer section from the inner section;

each electrical heater being comprised of an electrical resistance disposed along a longitudinal dimension of the outer section of the seal forming element, the electrical resistance being distributed along the longitudinal dimension with a higher electric resistance being adjacent to a part of the intermediate section through which heat flows to the inner section and a lower electrical resistance which is disposed adjacent to the thermal insulation of the intermediate section;

each seal forming element being radially adjustable to vary the spacing between the spaced apart thermal seals; and wherein the electrical heater is a film resistance disposed on a surface of the outer section which contacts the at least one web.

37. A sealing system which forms spaced apart thermal seals along at least one moving web by contact of the moving at least one web with heated portions of sealing elements mounted on a sealing wheel during rotation comprising:

seal forming elements which peripherally contact the at least one web to form the thermal seals by heat transfer to the at least one web;

each seal forming element having an outer section, on which is located at least one electrical heater, an inner section which contacts the sealing wheel and an intermediate section which includes thermal insulation which thermally insulates the outer section from the inner section;

each electrical heater being comprised of an electrical resistance disposed along a longitudinal dimension of the outer section of the seal forming element, the electrical resistance being distributed along the longitudinal dimension with a higher electric resistance being adjacent to a part of the intermediate section through which heat flows to the inner section and a lower electrical resistance which is disposed adjacent to the thermal insulation of the intermediate section;

the inner section of each seal forming element being joined to upper and lower parts of the sealing wheel which are separated on an axis of rotation of the wheel; and the higher electrical resistance being located proximate to the upper and lower parts of the wheel and the lower electrical resistance separates the higher electrical resistance proximate to the upper and lower parts;

each seal forming element being radially adjustable to vary the spacing between the spaced apart thermal seals; and wherein the electrical heater is a film resistance disposed on a surface of the outer section which contacts the at least one web.

38. Apparatus for sealing at least one film ply to another film ply to at least partially form a chain of continuously moving, connected pouches, said apparatus comprising:

a plurality of sealing elements, each including an outer sealing section one first thermal mass and an inner section coupled to a wheel, together with other inner sections of other outer sealing sections, said inner sections and wheel having a second thermal mass greater than the thermal mass of an outer sealing section;

a heater wholly disposed on said outer sealing section for heating said outer sealing section to engage and seal one said film ply to another when said one film ply is applied thereto; and means for thermally insulating said outer sealing section from said inner section.

* * * * *

UNITED STATES PATENT AND TRADEMARK OFFICE
CERTIFICATE OF CORRECTION

PATENT NO. : 6,917,014 B2  Page 1 of 1
APPLICATION NO. : 10/700138
DATED : July 12, 2005
INVENTOR(S) : Boris E. Makutonin et al.

It is certified that error appears in the above-identified patent and that said Letters Patent is hereby corrected as shown below:

Column 1, line aproximately 34, reads "such as powered food" and should read -- such as powdered food-- .

Column 2, line 16, reads "seal grow" and should read --seals grow-- .

Column 7, line approximately 56, reads "and pair of" and should read --and a pair of -- .

Column 8, lines approximately 32, reads "which we parallel" and should read --which is parallel-- .

Column 9, line approximately 50, reads "and end seal" and should read --and an end seal-- .

Column 9, line approximately 64, reads "Fibs. 3-7" and should read --Figs. 3-7 -- .

Column 10, line approximately 41, reads "on a opposed sides" and should read --on opposed sides-- .

Column 12, line approximately 34, reads "FIGS. 34" and should read --FIGS. 3-6 -- .

Column 15, line 54, reads "opening ink one" and should read --opening into one -- .

Column 20, line 32, reads "section one" and should read --section, one--.

Signed and Sealed this

Nineteenth Day of December, 2006

JON W. DUDAS
*Director of the United States Patent and Trademark Office*